(12) United States Patent
Schlote

(10) Patent No.: US 6,668,539 B2
(45) Date of Patent: Dec. 30, 2003

(54) ROTARY HEAT ENGINE

(75) Inventor: Andrew Schlote, Fenton, MO (US)

(73) Assignee: Innovative Energy, Inc., St. Charles, MO (US)

( * ) Notice: Subject to any disclaimer, the term of this patent is extended or adjusted under 35 U.S.C. 154(b) by 0 days.

(21) Appl. No.: 09/933,525

(22) Filed: Aug. 20, 2001

(65) Prior Publication Data

US 2003/0033808 A1 Feb. 20, 2003

(51) Int. Cl.⁷ .............................. F02K 7/08; F03B 3/00
(52) U.S. Cl. .......................................... 60/39.35; 415/80
(58) Field of Search ........................ 60/39.34, 39, 35; 415/63, 80

(56) References Cited

U.S. PATENT DOCUMENTS

| | | | | |
|---|---|---|---|---|
| 726,315 | A | * 4/1903 | Lindmark | 415/80 |
| 834,371 | A | * 10/1906 | Duc | 415/80 |
| 2,499,863 | A | 3/1950 | Hart | |
| 2,536,600 | A | 1/1951 | Goddard | |
| 2,544,420 | A | 3/1951 | Goddard | |
| 2,603,947 | A | 7/1952 | Howard | |
| 2,612,750 | A | 10/1952 | Goddard | |
| 2,628,473 | A | 2/1953 | Frye | |
| 2,637,166 | A | 5/1953 | Carswell | |
| 3,032,988 | A | * 5/1962 | Kleckner | 60/39.35 |
| 3,177,660 | A | 4/1965 | Haller | |
| 4,625,509 | A | 12/1986 | Sheppard, Sr. | |
| 5,282,356 | A | 2/1994 | Abell | |
| 5,408,824 | A | 4/1995 | Schlote | |
| 5,544,961 | A | 8/1996 | Fulks et al. | |
| 5,560,196 | A | 10/1996 | Schlote | |
| 5,636,509 | A | 6/1997 | Abell | |
| 5,709,076 | A | 1/1998 | Lawlor | |

OTHER PUBLICATIONS

US 6,233,918, 5/2001, Lawlor (withdrawn)
"Elements of Gas Dynamics", by Liepmann and Roshko, John Wiley & Sons, Inc., 1957, pp. 127–130.*

* cited by examiner

Primary Examiner—Michael Koczo
(74) Attorney, Agent, or Firm—Thompson Coburn

(57) ABSTRACT

A jet-propelled rotary engine comprises a stator and a rotor operatively coupled to the stator for rotation of the rotor relative to the stator about a rotor axis. The rotor comprises at least first and second jet assemblies wherein the first jet assembly defines a first converging flow region, a first diverging flow region downstream of the first converging flow region, and a first discharge port and wherein the second jet assembly defines a second converging flow region, a second diverging flow region downstream of the second converging flow region, and a second discharge port. The rotary engine further comprises a combustion region having an upstream portion and is adapted to cause a combustion reaction of an oxygen-fuel mixture in the combustion region in a manner to form combustion reaction products which comprise at least a part of thrust matter to be discharged through the discharge ports of the first and second jet assemblies. The rotary engine is adapted to combust at least some of the oxygen-fuel mixture in the upstream portion of the combustion region such that at least a portion of the combustion reaction occurs in the upstream portion of the combustion region and is adapted and configured to channel at least some of the thrust matter formed in the upstream portion of the combustion region through the discharge ports of the first and second jet assemblies.

24 Claims, 7 Drawing Sheets

ROTARY HEAT ENGINE

BACKGROUND OF THE INVENTION

This invention relates to jet propelled, rotary engines having rotors rotationally driven by the reactive force of matter being discharged from jet assemblies.

Producing motive power through the reactive force of jets has long been known. For instance, Goddard U.S. Pat. No. 2,637,166 discloses a turbine in which the reactions of high velocity jets are used to effect rotation of a turbine. Howard U.S. Pat. No. 2,603,947 discloses a ram jet arrangement for rotation in a continuous combustion-type generator. Goddard U.S. Pat. No. 2,544,420 discloses a combustion chamber used to provide rotational power in a propulsion apparatus such as in driving a propeller shaft. Hart U.S. Pat. No. 2,499,863 discloses a rotary jet propelled motor.

More recently, the inventor has made developments in the field of rotary heat engines for which he has received U.S. Pat. Nos. 5,408,824, issued Apr. 25, 1995, and 5,560,196, issued Oct. 1, 1996, the disclosures of which are hereby incorporated by reference.

SUMMARY OF THE INVENTION

Among the advantages of the present invention may be noted the provision of an improved rotary heat engine and a method of using the same.

In one aspect of the present invention, a jet-propelled rotary engine comprises a stator and a rotor operatively coupled to the stator for rotation of the rotor relative to the stator about a rotor axis. The rotor comprises at least first and second jet assemblies. The first jet assembly defines a first converging flow region, a first diverging flow region downstream of the first converging flow region, and a first discharge port. The second jet assembly defines a second converging flow region, a second diverging flow region downstream of the second converging flow region, and a second discharge port. The rotary engine further comprises a combustion region having an upstream portion. The rotary engine is adapted to cause a combustion reaction of an oxygen-fuel mixture in the combustion region in a manner to form combustion reaction products which comprise at least a part of thrust matter to be discharged through the discharge ports of the first and second jet assemblies. The rotary engine is adapted to combust at least some of the oxygen-fuel mixture in the upstream portion of the combustion region such that at least a portion of the combustion reaction occurs in the upstream portion of the combustion region and is adapted and configured to channel at least some of the thrust matter formed in the upstream portion of the combustion region through the discharge ports of the first and second jet assemblies.

In a another aspect of the present invention, a jet-propelled rotary engine comprises a stator and a rotor operatively coupled to the stator for rotation of the rotor relative to the stator about a rotor axis. The rotor comprises at least one jet assembly that defines a converging flow region, a diverging flow region downstream of the converging flow region, and a discharge port. The rotary engine has a combustion region that includes an upstream portion and is adapted to cause a combustion reaction of an oxygen-fuel mixture in the combustion region in a manner to form combustion reaction products which comprise at least a part of thrust matter to be discharged through the discharge port. The rotary engine is further adapted to combust at least some of the oxygen-fuel mixture in the upstream portion of the combustion region. The jet assembly is adapted for supersonic discharge of a jet stream of the thrust matter from the discharge port with the jet stream having a jet stream centerline as the thrust matter is being discharged from the discharge port. The upstream portion of the combustion region is spaced from the rotor axis a distance not greater than 90% of R, where R is the shortest distance between the rotor axis and the jet stream centerline.

In yet another aspect of the present invention, a jet-propelled rotary engine comprises a stator and a rotor operatively coupled to the stator for rotation of the rotor relative to the stator about a rotor axis. The rotor comprises at least one jet assembly that defines a converging flow region, a diverging flow region downstream of the converging flow region, and a discharge port. The jet assembly is adapted to traverse a circular path as the rotor rotates about the rotor axis. A combustion region is defined at least in part by the rotor and has an upstream portion. The rotary engine is adapted to cause a combustion reaction of an oxygen-fuel mixture in the combustion region in a manner to form combustion reaction products which comprise at least a part of thrust matter to be discharged through the discharge port of the jet assembly. The rotary engine is further adapted to combust at least some of the oxygen-fuel mixture in the upstream portion of the combustion region such that at least a portion of the combustion reaction occurs in the upstream portion of the combustion region. The rotary engine is further adapted and configured to channel at least some of the thrust matter formed in the upstream portion of the combustion region through the discharge port of the jet assembly and further comprises a generally annular duct circumscribing the circular path traversed by the jet assembly. The duct has a generally annular duct diverging region and an annular duct end wall. The duct diverging region diverges as it extends radially outward and the duct end wall has an inner surface that circumscribes the duct diverging region.

In yet another aspect of the present invention, a jet-propelled rotary engine comprises a stator and a rotor operatively coupled to the stator for rotation of the rotor relative to the stator about a rotor axis. The rotor comprises at least first and second jet assemblies. The first jet assembly defines a first converging flow region, a first diverging flow region downstream of the first converging flow region, and a first discharge port. The second jet assembly defines a second converging flow region, a second diverging flow region downstream of the second converging flow region, and a second discharge port. The rotary engine further comprises a combustion region having an upstream portion defined by the stator. The rotary engine is adapted to cause a combustion reaction of an oxygen-fuel mixture in the combustion region in a manner to form combustion reaction products which comprise at least a part of thrust matter to be discharged through at least one of the discharge ports of the first and second jet assemblies. The rotary engine is further adapted to combust at least some of the oxygen-fuel mixture in the upstream portion of the combustion region such that at least a portion of the combustion reaction occurs in the upstream portion of the combustion region.

In yet another aspect of the present invention, a jet-propelled rotary engine comprises a stator and a rotor operatively coupled to the stator for rotation of the rotor relative to the stator about a rotor axis. The rotor comprises at least one steam passageway that defines a steam inlet port, a steam converging flow region, a steam diverging flow region downstream of the steam converging flow region, and a steam discharge port. The steam discharge port is adapted to traverse a circular path as the rotor rotates about the rotor axis. The steam passageway is separate from any combustion region of the rotor and is adapted to discharge steam through the steam discharge port a supersonic velocity. The rotary engine further comprises a generally annular duct circumscribing the circular path traversed by the steam discharge port. The duct has a generally annular duct diverging region that diverges as it extends radially outwardly.

In yet another aspect of the present invention, a method comprises providing a jet-propelled rotary engine having a stator, a rotor, a combustion region, and a generally annular duct. The rotor is operatively coupled to the stator for rotation of the rotor relative to the stator about a rotor axis. The rotor comprises at least one jet assembly that defines a converging flow region, a diverging flow region downstream of the converging flow region, and a discharge port. The jet assembly is adapted to traverse a circular path as the rotor rotates about the rotor axis. The combustion region is defined at least in part by the rotor and has an upstream portion. The rotary engine is adapted to cause a combustion reaction of an oxygen-fuel mixture in the combustion region in a manner to form combustion reaction products which comprise at least a part of thrust matter to be discharged through the discharge port of the jet assembly. The rotary engine is further adapted to combust at least some of the oxygen-fuel mixture in the upstream portion of the combustion region such that at least a portion of the combustion reaction occurs in the upstream portion of the combustion region. The rotary engine is further adapted and configured to channel at least some of the thrust matter formed in the upstream portion of the combustion region through the discharge port of the jet assembly. The duct circumscribes the circular path traversed by the jet assembly. The method further comprises causing a cooling fluid to flow adjacent the annular duct in a manner to cool the duct.

In yet another aspect of the present invention, a method comprises providing a jet-propelled rotary engine having a stator, a rotor, and a combustion region. The rotor is operatively coupled to the stator for rotation of the rotor relative to the stator about a rotor axis and comprises at least one thrust matter jet assembly and at least one steam jet assembly. The thrust matter jet assembly defines a thrust matter converging flow region, a thrust matter diverging flow region downstream of the thrust matter converging flow region, and a thrust matter discharge port. The steam jet assembly defines a steam converging flow region, a steam diverging flow region downstream of the steam converging flow region, and a steam discharge port. The combustion region is defined at least in part by the rotor. The rotary engine is adapted to cause a combustion reaction of an oxygen-fuel mixture in the combustion region in a manner to form combustion reaction products which comprise at least a part of thrust matter to be discharged through the thrust matter discharge port. The method further comprises operating the jet propelled rotary engine in a manner such that a jet stream of the thrust matter is discharged from the thrust matter discharge port at a supersonic velocity and operating the jet propelled rotary engine in a manner such that a jet stream of steam is discharged from the steam discharge port at a supersonic velocity.

Other features and advantages of the invention will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
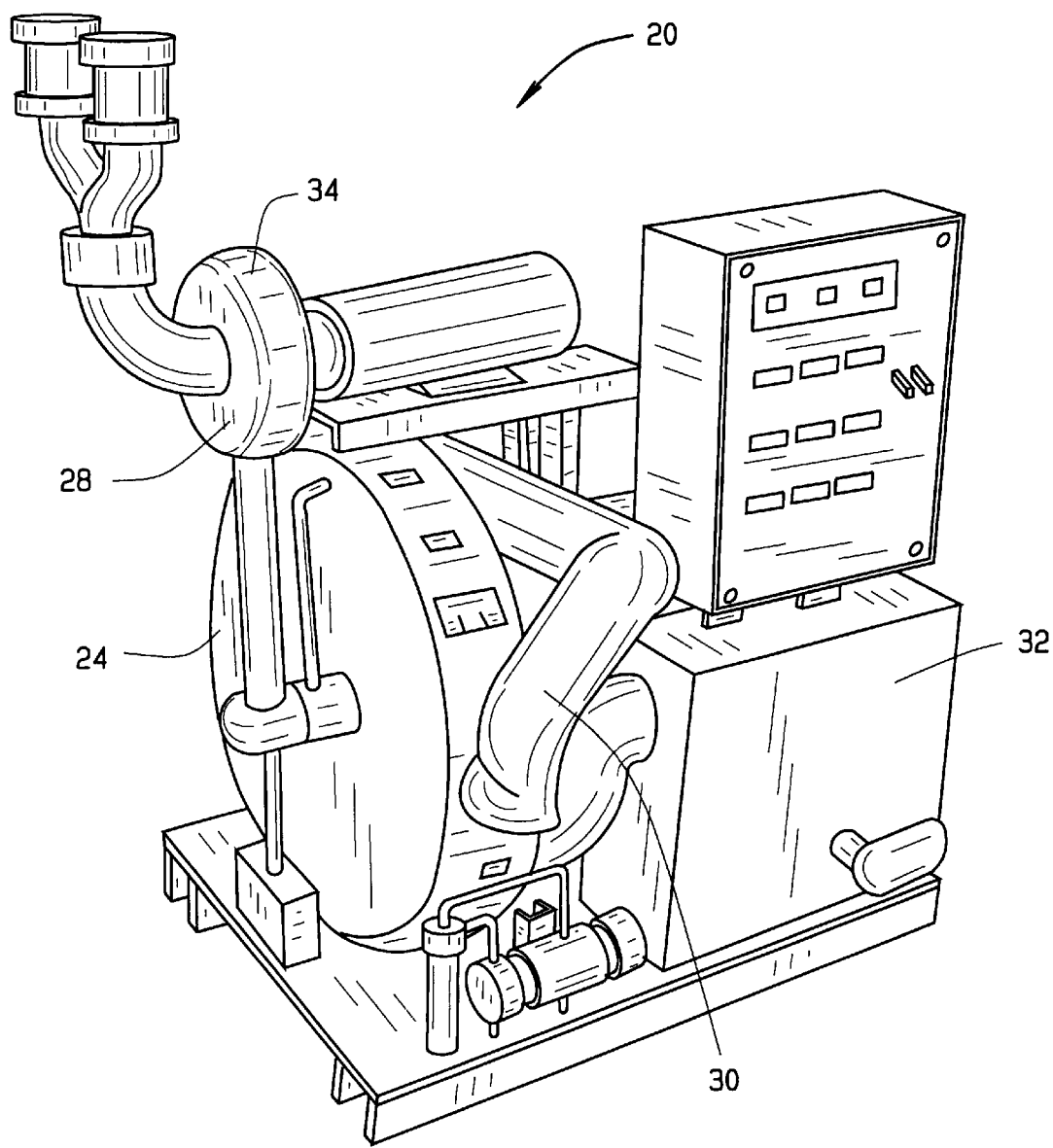
FIG. 1 is a perspective view of a rotary heat engine of the present invention.

Referring now to the drawings, and first more particularly to FIG. 1, a rotary heat engine of the present invention is indicated in its entirety by the reference numeral 20. The rotary engine 20 is adapted to burn various types of fuel to produce rotational mechanical power which is then preferably converted into electrical power.

Figure 2:
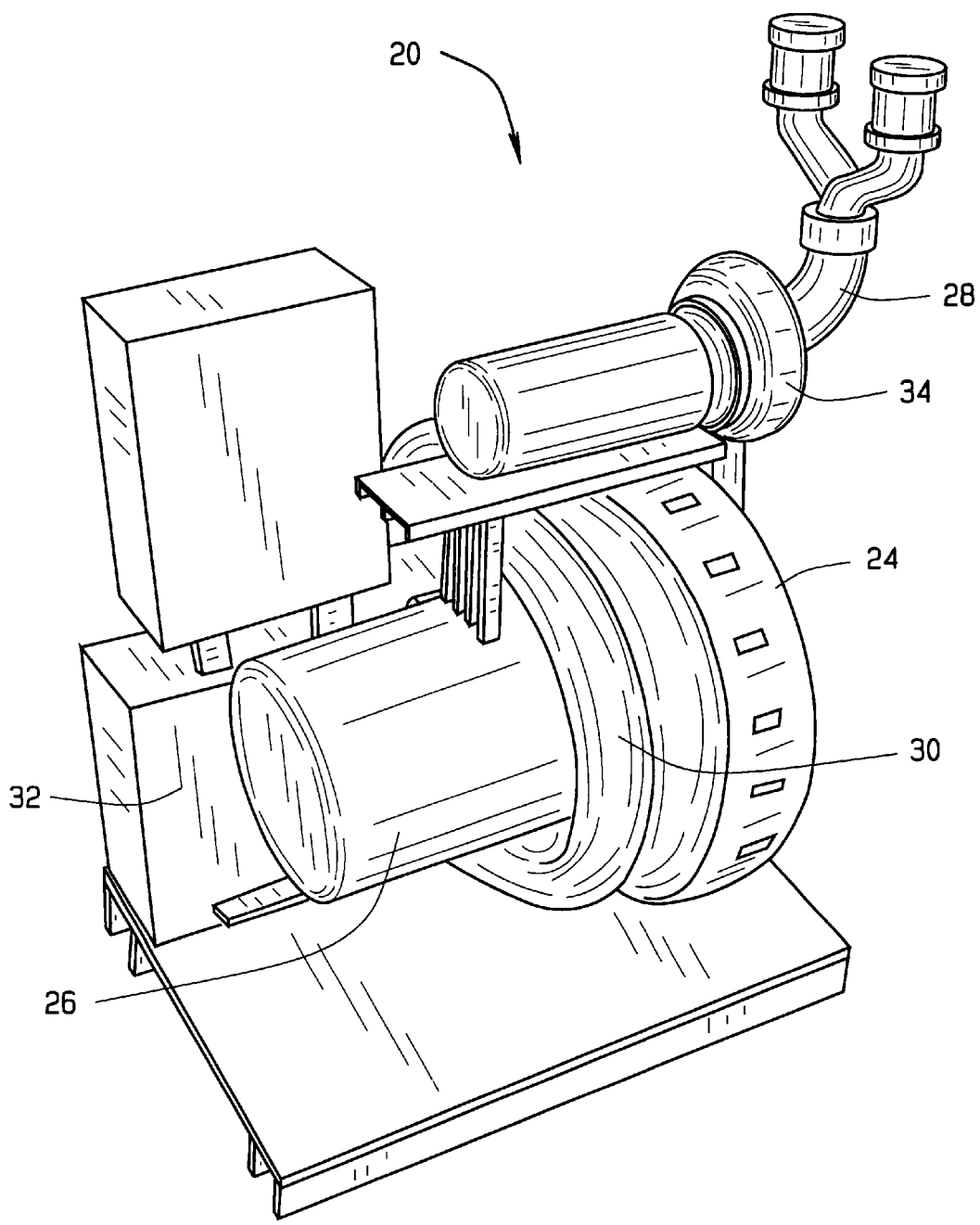
FIG. 2 is a perspective view of the rotary heat engine of FIG. 1 shown generally from the opposite side.

The rotary engine 20 generally comprises a main engine assembly 22 (shown in FIG. 3 but concealed from view in FIGS. 1 and 2), a housing 24, an electrical generator 26, an air supply assembly 28, a super-heater 30, and a boiling plate heat exchanger 32. The air supply assembly 28 preferably utilizes an electrically powered supercharger to provide pressurized air to the main engine assembly 22. The pressurized air is then mixed with fuel and combusted in the main engine assembly 22 to create rotational mechanical power via the reactive force of the jet expulsion of exhaust matter. The rotational mechanical power drives the electrical generator 26, which is preferably a direct current generator coupled to an inverter, to produce electrical power. The exhaust matter is exhausted from the main engine assembly 22 through the super-heater 30 and then the heat exchanger 32 prior to being expelled from the rotary engine 20.

Figure 3:
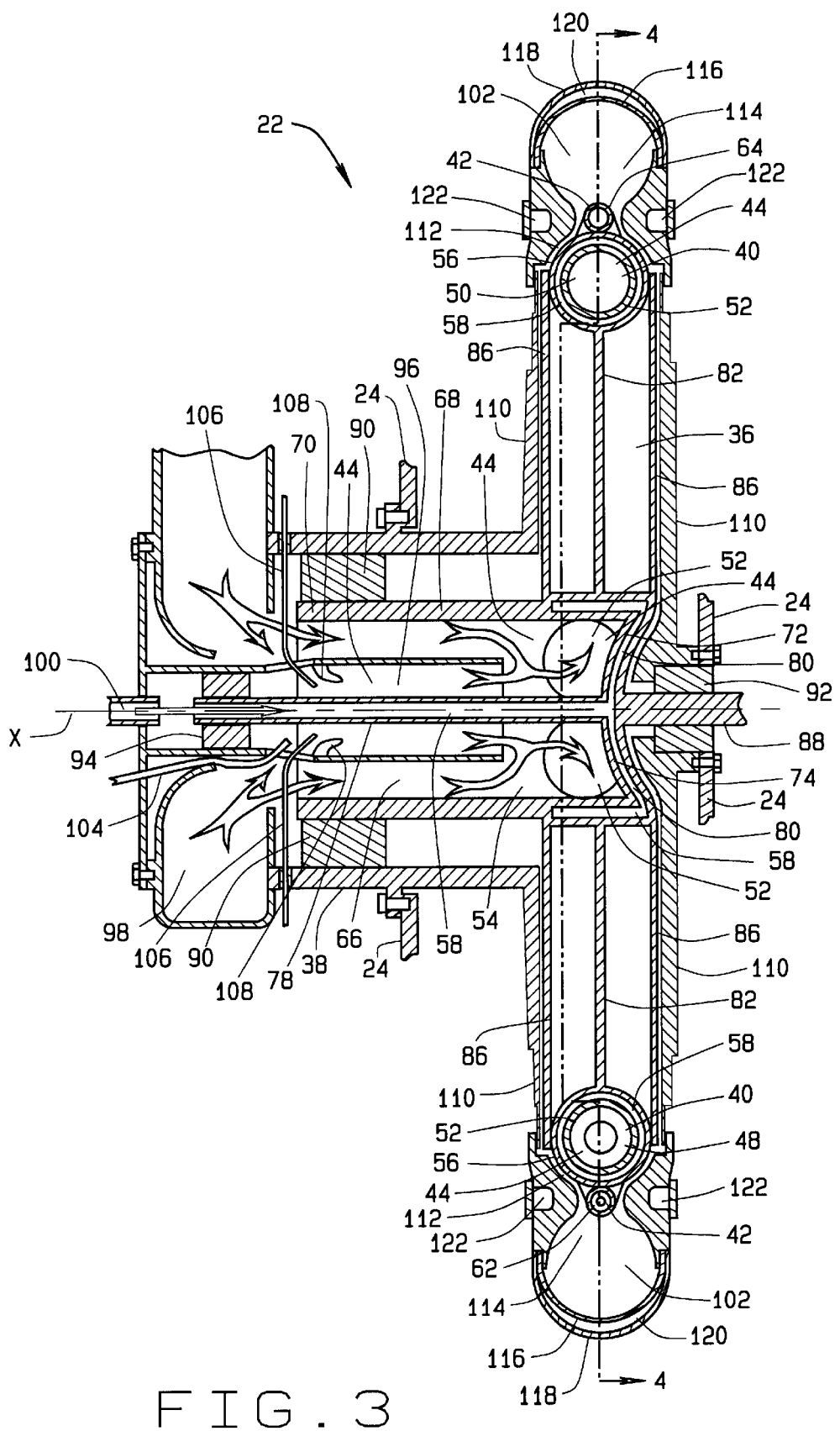
FIG. 3 is a fragmented cross-sectional view of the main engine assembly of the rotary heat engine of FIG. 1 taken about a plane containing the rotor axis.

The main engine assembly 22 shown in FIG. 3 comprises a rotor 36 and a stator 38. The rotor 36 is mounted for rotation relative to the stator 38 in a manner such that heat generated by the combustion of the fuel matter is converted into rotational motion of the rotor about the rotor axis X relative to the stator.

Figure 4:
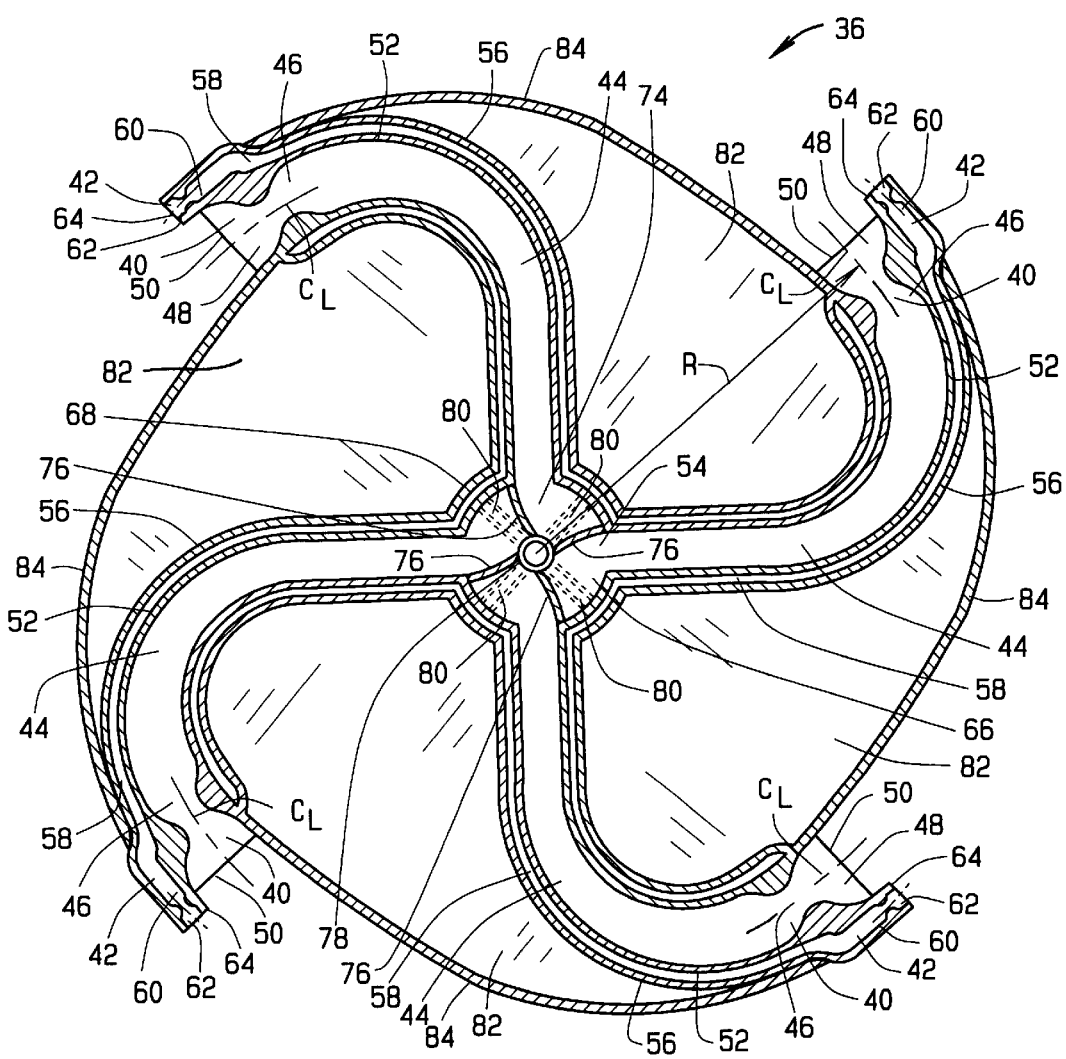
FIG. 4 is a cross-sectional view of the rotor of the rotary heat engine shown in FIG. 1 taken along the plane of line 4—4 of FIG. 3.
Figure 5:
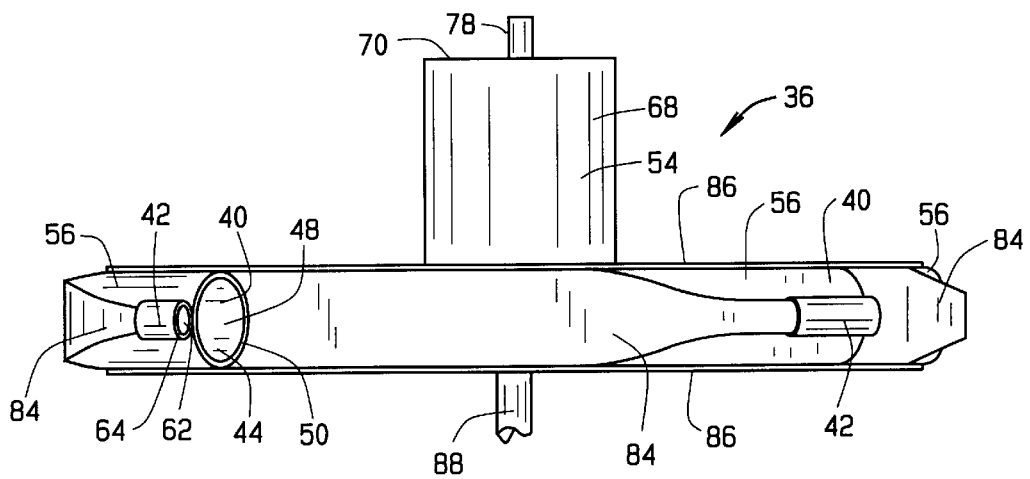
FIG. 5 is a side-elevational view of the rotor of the rotary heat engine of FIG. 1.

The rotor 36, shown by itself in FIGS. 4 and 5, comprises a plurality of (preferably four) thrust matter jet assemblies 40 and a plurality of steam jet assemblies 42 radially spaced from the rotor axis X. Each of the thrust matter jet assemblies 40 defines a downstream portion of a thrust matter passageway 44 and each comprises a thrust matter converging region 46, a thrust matter diverging region 48 that is downstream of the thrust matter converging region, and a thrust matter discharge port 50. Each of the thrust matter passageways 44 is preferably partially defined by a thrust matter tube 52 that extends radially outward from a centrally positioned thrust matter plenum 54 at an angle perpendicular to the rotor axis X and thereafter turns to extend circumferentially about the rotor axis X in a direction opposite that of the designed rotation of the rotor such that the thrust matter discharge ports are configured and adapted to discharge thrust matter in a direction generally tangential to the rotor axis X. The thrust matter tubes 52 are preferably round in cross-section and are preferably formed of titanium so as to be lightweight, strong, and heat resistant.

The rotor 36 further includes a plurality of (preferably four) steam tubes 56 each circumscribing a corresponding one of the thrust matter tubes 52. The inner diameter of the steam tube 56 is larger than the outer diameter of the thrust tube 52 to define a steam passageway 58 therebetween. Like the thrust matter tubes 52, the steam tubes 56 are preferably formed of titanium and preferably have a round cross-section. Each steam tube 56 is preferably tig welded to its corresponding thrust matter tube at intermittent locations along its length and circumference so as to fix the relative positions therebetween. Each steam passageway 58 is in communication with one of the steam jet assemblies 42 in a manner such that the respective steam jet assembly 42 forms the downstream portion of the steam passageway. Like the thrust matter jet assemblies 40, each of the steam jet assemblies comprises a steam converging region 60, a steam diverging region 62 downstream of the steam converging region, and a steam discharge port 64.

The thrust matter plenum 54 of the rotor 36 preferably has a generally cylindrical internal volume 66 defined by a cylindrical plenum wall 68 that is aligned with the rotor axis X. A first axial end 70 of the cylindrical plenum wall 68 extends axially from the remainder of the rotor 36 and is preferably open to the exterior of the rotor 36. An opposite second axial end 72 of the plenum is closed via an end wall 74 which is preferably convex relative to the internal volume 66 of the thrust matter plenum 54. A plurality of guide vanes 76 preferably extend radially inward into the internal volume 66 of the thrust matter plenum 54 from the cylindrical plenum wall 68 and axially from the end wall 74 of the thrust matter plenum. The guide vanes 76 and the convex shape of the end wall 74 are configured and adapted to increase the efficiency of the gas flow from the thrust matter plenum 54 into the thrust matter tubes 52 when the rotor 36 is revolving about the rotor axis X during operation of the rotary engine 20.

A central steam tube 78 is axially aligned with the rotor axis X and extends inside the internal volume 66 of the thrust matter plenum 54. The central steam tube 78 is attached at one of its axial ends to the end wall 74 of the thrust matter plenum 54 and has an opposite axial end that extends past the first axial end 70 of the cylindrical plenum wall 68. A plurality of steam conduits 80 adjacent the end wall 74 of the thrust matter plenum 54 connect the central steam tube 78 to the plurality of steam tubes 56 such that the central steam tube and the steam conduits form portions of the steam passageways 58 of the rotor 36.

The rotor 36 of the preferred embodiment further comprises a plurality of webs 82, a plurality of throat seals 84, a pair of discoidal drag plates 86, and a drive shaft 88. Each web 82 is oriented perpendicular to the rotor axis X and is preferably axially aligned with the center of the steam tubes 56 in a manner such that each web interconnects a pair of adjacent steam tubes. Each throat seal 84 is preferably an arcuate piece of titanium having a rectangular cross-section and each is preferably welded to the radially outermost edge of one of the webs 82. Each throat seal 84 preferably has an axially width equal to the diameter of the steam tubes 56 where it terminates adjacent one of the thrust matter discharge ports 50 and becomes axially more narrow where it terminates adjacent one of the steam jet assemblies 42 (as shown in FIG. 5). The drag plates 86 are oriented perpendicular to the rotor axis X and are attached to the axially opposite sides of the steam tubes 56. The drive shaft 88 is axially aligned with the rotor axis X and extends axially from the rotor 36 in a direction opposite that of the thrust matter plenum 54 and the central steam tube 78. The drive shaft 88 is configured and adapted to transfer the rotational mechanical power generated by the rotor 36 to the electrical generator 26 of the rotary engine 20 for producing electrical power.

The stator 38 of the main engine assembly 22 preferably surrounds a portion of the rotor 36. A plurality of air bearings rotationally mount the rotor 36 relative to the stator 38. A first air bearing 90 supports the first axial end 70 of plenum wall 68 of the rotor 36. A second air bearing 92 supports the drive shaft 88 of the rotor 36. Furthermore, a third air bearing 94 supports the central steam tube 78 of the rotor 36. Air bearings are preferably used to reduce rotational friction and heat which would otherwise be produced if conventional roller or ball bearings were utilized due to the high rotational speed of the rotor 36 relative to the stator 38 during operation of the rotary engine 20.

The stator 38 of the main engine assembly 22 preferably comprises a tubular combustion chamber 96, an annular air plenum 98, a stream passageway 100, and an annular duct 102. The combustion chamber 96 is preferably aligned with the rotor axis X and is preferably cylindrical in shape having a radius that is substantially less than R, where R is the shortest distance between the rotor axis X and the jet stream centerline $C_L$ of the thrust matter jet assemblies 40. Preferably, the combustion chamber partially extends into the thrust matter plenum 54 of the rotor 36 through the first axial end 70 of the plenum wall 68. The air inlet plenum 98 of the stator 38 surrounds the rotor axis X and defines an air passageway that is in communication with the air supply assembly 28 of the rotary engine 20, the combustion chamber 96 of the stator 38, and the region between the combustion chamber and the plenum wall 68 of the rotor 36. The steam passageway 100 of the stator 38 is in communication with the super-heater 30 of the rotary engine 20 and the central steam tube 78 of the rotor 36.

The stator preferably further comprises a fuel supply line 104, a plurality of tungsten spark wires 106, and a plurality of mixing vanes 108. The fuel supply line 104 is configured and adapted to provided fuel from a fuel source (not shown) to the combustion chamber 96. The spark wires 106 are configured and adapted to ignite the fuel supplied to the combustion chamber 96. The mixing vanes 108 are positioned within the combustion chamber 96 and are configured and adapted to mix the fuel and air being supplied to the combustion chamber.

Figure 6:
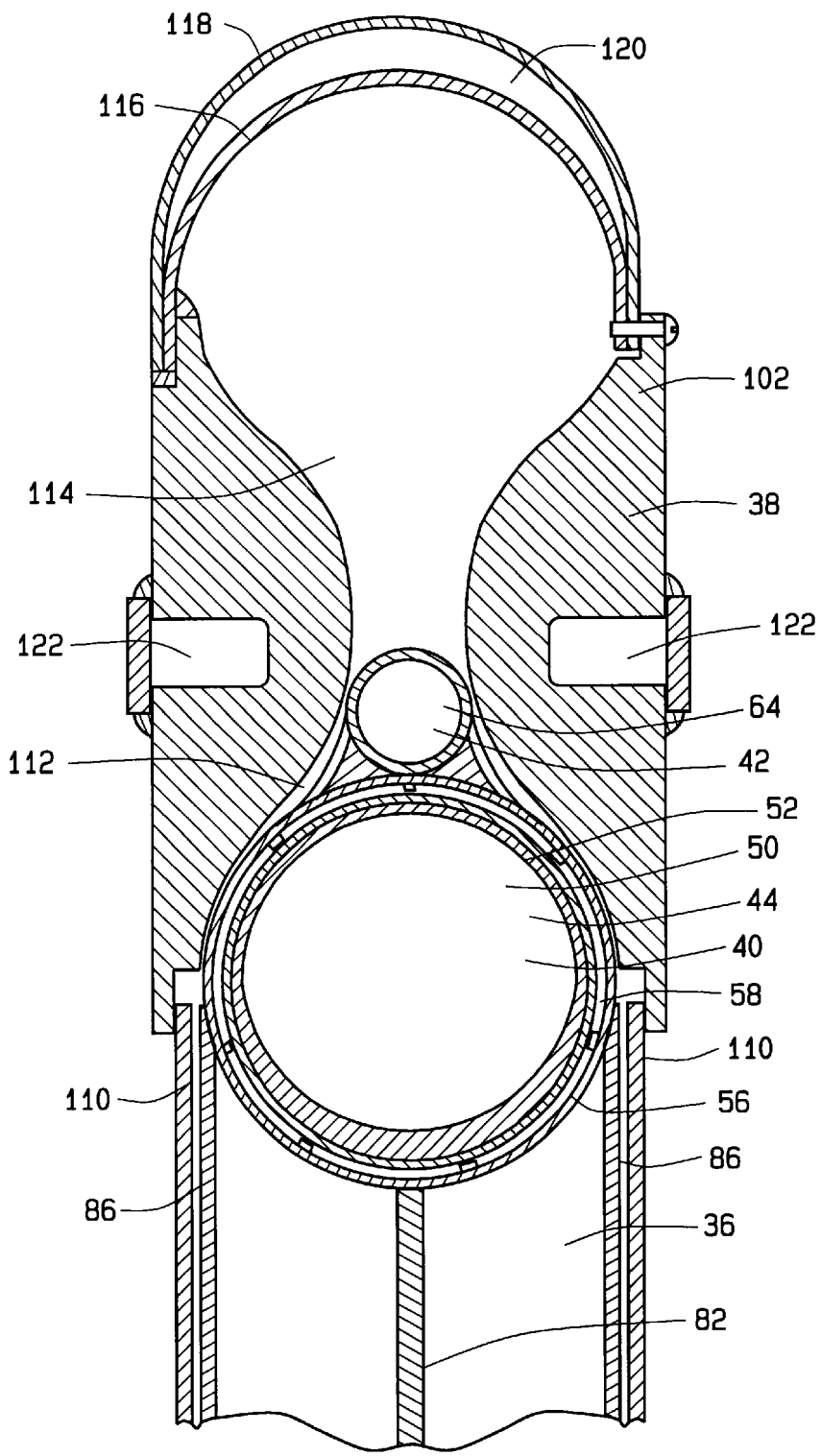
FIG. 6 is an enlarged, fragmented cross-sectional view of the rotary heat engine of FIG. 1 taken about a plane that includes the rotor axis and showing the radially outward-most portion of the rotor and the adjacent annular duct.

The annular duct 102 of the stator 38 encircles the thrust matter jet assemblies 40 and the steam jet assemblies 42 of the rotor 36 and is attached to the remainder of the stator via drag plates 110 of the stator 38 that are positioned axially adjacent the drag plates 86 of the rotor. The annular duct 102 of the preferred embodiment is shown in detail in FIG. 6 and preferably comprises an annular converging region 112, an annular diverging region 114 encircling the annular converging region, and an annular end wall 116 encircling the annular diverging region. The annular end wall 116 is preferably arcuate in cross-section and is preferably surrounded by an annular outer wall 118 that is also arcuate in cross-section and that is spaced from the annular end wall of the duct 102 such that an annular first steam passageway 120 is defined therebetween. A pair of annular second steam passageways 122 are also provided on axially opposite sides of the duct 102.

Figure 7:
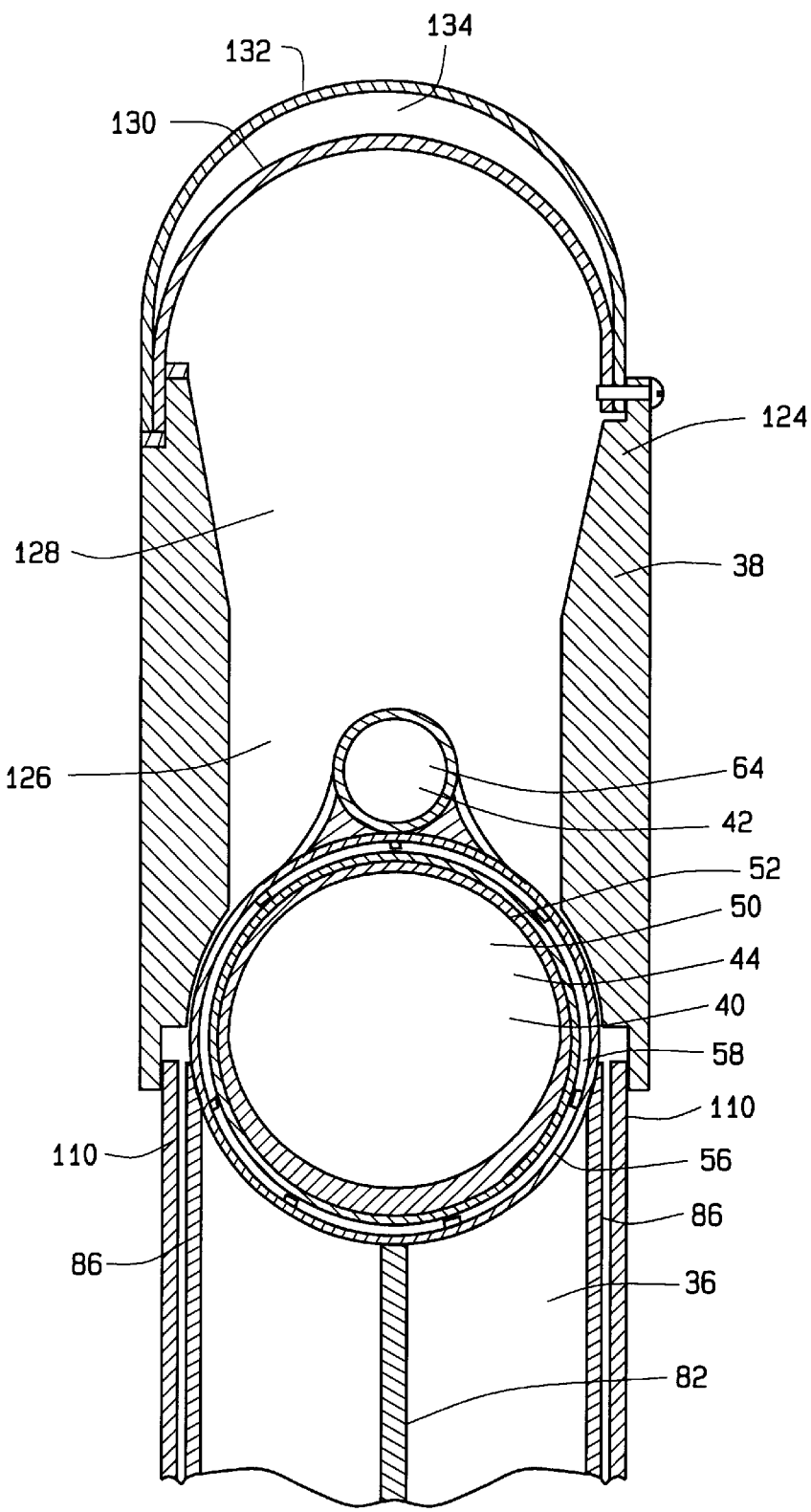
FIG. 7 is a view similar to FIG. 6 showing an alternative embodiment of the annular duct.

An alternative duct 124 is shown in FIG. 7 and comprises an annular throat region 126 having an axially width approximately equal to that of the thrust matter discharge ports 50 of the rotor 36. Like the preferred embodiment of the duct 102 shown in FIG. 6, the alternative duct 124 also comprises an annular diverging region 128 that encircles the annular throat region 126, an annular end wall 130 that encircles the annular diverging region, and an annular outer wall 132 that is spaced from the annular end wall of the duct such that an annular steam passageway 134 is defined therebetween.

Figure 8:
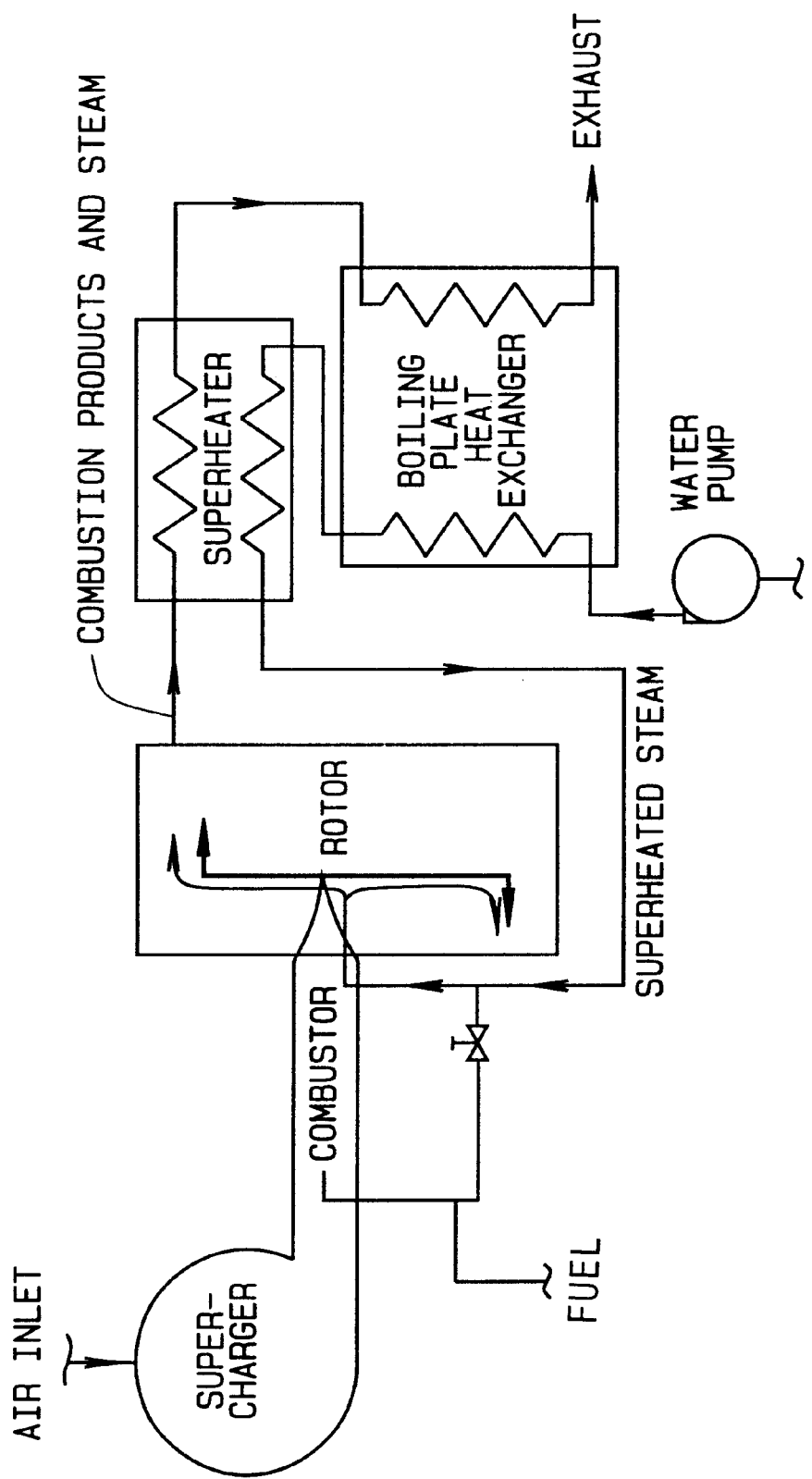
FIG. 8 is a flow diagram of the operation of the rotary heat engine of FIG. 1.

The operation of the rotary engine 20 is shown schematically in FIG. 8. When in operation, the air supply assembly 28 preferably draws in air via a multi-stage centrifugal fan supercharger to provide air to the main engine assembly 22 at a pressure preferably between 60 and 70 psi. Alternatively, oxygen may be added to or used in place of the air being supplied to the rotary engine 20 (air and/or oxygen being referred to as "air" throughout this specification). Once in the air plenum 98 of the stator 38, the air is channeled such that a portion of the air flow passes into the combustion chamber 96 of the stator 38 and such that a portion passes around the combustion chamber between the combustion chamber and the plenum wall 68 of the rotor 36. The air flow flowing between the combustion chamber 96 and the plenum wall 68 acts to cool the walls of the combustion chamber 96 and to maintain the plenum wall 68 at a relatively low temperature near the first air bearing 90 of the main engine assembly 22.

The rotary engine 20 is configured and adapted to burn various types of fuels, such as methane, propane, natural gas, gasoline, diesel, and kerosene. As shown in FIG. 8 and described below in greater detail, some of the super heated steam provided to the rotor 36 may be mixed with the fuel to hydroxylate the fuel prior to its discharge into the combustion chamber 96. The mixing vanes 108 in the combustion chamber 96 ensure that the fuel supplied by the fluid supply line 104 and the air provided by the air plenum 98 are thoroughly mixed in the combustion chamber. The spark wires 106 are utilized to initially ignite the fuel and air mixture. However, once the air and fuel mixture is ignited during the operation of the rotary engine, the combustion is continuous until the fuel supply is shut off.

Mixed in with the reaction products of the combustion is non-reaction matter, i.e., matter such as nitrogen, excess and bypass air, oxygen, water, etc., introduced into the thrust matter plenum 54 but which is not part of the combustion reaction. The combustion reaction products and non-reaction matter (collectively, the "thrust matter") flow from the thrust matter plenum 54 into the thrust matter tubes 52 of the rotor 36. Although the combustion of the air and fuel mixture originates in the combustion chamber 96 of the stator 38, combustion continues as the air and fuel mixture passes into the thrust matter plenum 54 of the rotor 36 and through other portions of the thrust matter passageways 44. Thus, combustion occurs both in a region that is both within the stator 38 and the within the rotor 36. The guide vanes 76 in the thrust matter plenum 54 help divert the thrust matter into the thrust matter tubes 52 of the rotor 36. By positioning the combustion region of the rotary engine 20 upstream of the thrust matter discharge ports 50 of the rotor 36, flameouts of the thrust matter jet assemblies 40 are reduced and are possibly eliminated.

The stator 38 of the main engine assembly 22 is configured and adapted such that the steam supplied via the steam passageway 100 of the stator 38 is delivered into the central steam tube 78 of the rotor 36. Prior to entering the central steam tube 78 of the rotor 36, the steam from the steam passageway 100 of the stator 38 is preferably super-heated, as discussed below, to approximately 800° F. As the steam passes inside the central steam tube 78 of the rotor and into the steam tubes 56, the steam is further heated by the hot thrust matter.

The thrust matter passing within the thrust matter passageways 44 of the rotor 36 ultimately reaches the thrust matter jet assemblies 40. As the thrust matter passes through the thrust matter converging region 46 of the thrust matter jet assemblies 40, the velocity of the thrust matter is increased to approximately Mach 1.0 after which the thrust matter passes into the thrust matter diverging region 48 where it is further accelerated and ultimately discharges through the thrust matter discharge ports 50 at a velocity of preferably approximately Mach 2.7. Likewise, as the steam travels in the steam passageways 58, it eventually passes through the steam jet assemblies 42 of the rotor 36 where the velocity of the steam is accelerated via the steam converging region 60 and the steam diverging region 62 to a supersonic velocity of approximately Mach 3.3 as it is discharged from the steam discharge ports 64 of the rotor 36. It is understood in the art that the discharge velocity of a compressible gas flow can be controlled by adjusting the cross-sectional area of the passageway in which the flow travels and/or by altering the total pressure or total temperature of the gas flow relative to the total pressure or total temperature of the environment into which the gas flow is discharged.

The reactive force of the thrust matter and steam being discharged from the thrust matter jet assemblies 40 and the steam jet assemblies 42 rotationally drives the rotor at preferably approximately 18,000 rpm. Air between the drag plates 110 of the stator 38 and the drag plates 86 of the rotor 36 is radially drawn out from therebetween due to the rotational motion of the rotor relative to the stator, thereby causing a partial vacuum that reduces the drag acting on the rotor.

The steam jet assemblies 42 preferably traverse a circular path about the rotor axis which is radially outward of the circular path traversed by the thrust matter jet assemblies 40. In the configuration of the annular duct 102 of the stator 38 shown in FIG. 6, the circular path of the steam jet assemblies 42 is radially positioned from the rotor axis X in a manner such that the steam jet assemblies are positioned within the converging region 112 of the annular duct near the annular diverging region 114. The narrowing nature of the throat seals 84 of the rotor 36 provides the throat seals with a contour that is similar to the contour of the annular duct 102 and allows the throat seals to effectively act as an inner radial boundary of the annular duct. Thus, the thrust matter and steam discharge from the thrust matter jet assemblies 40 and the steam jet assemblies 42 (collectively referred to as the "exhaust matter") must pass through the annular converging region 112 of the annular duct 102 where the exhaust matter flow converges in area and thereby decelerates. The annular converging region 112 of the annular duct 102 is configured to decelerate the exhaust matter flow rate to approximately Mach 1.0 after which the flow passes into the annular diverging region 114 of the annular duct 102 which further reduces the velocity of the flow to a subsonic speed. Thus, the annular converging region 112 and the annular diverging region 114 of the annular duct 102 act to reduce the flow rate of the exhaust matter without generating a strong shock wave in the path of the rotor. The higher relative discharge velocity of the steam from the steam jet assemblies 42 compared to the velocity of the thrust matter discharged from the thrust matter jet assemblies 40 acts to reduce the back pressure on the thrust matter being discharged from the thrust matter jet assemblies so as to increase engine efficiency while preventing the formation of strong shock waves within the circular path traversed by the jet assemblies 40,42. As the exhaust matter flow is decelerated, the kinetic energy of the flow is recovered with increases in static pressure and temperature which increases usable heat for extraction in the super heater (bottoming cycle).

Once the exhaust matter flow passes through the diverging region 114 of the annular duct 102, the flow is then directed circumferentially along the annular end wall 116 of the annular duct until it is ultimately discharged into the super-heater 30 of the rotary engine 20 through a discharge outlet (not shown) that extends through the annular end wall of the duct. Thus, the annular duct 102 constitutes a portion of a discharge region through which the exhaust matter flow passes. To recover some of the heat of the exhaust matter flow, the annular end wall 116 of the annular duct 102 is steam cooled via steam passing through the first steam passageway 120 created between the annular outer wall 118 and the annular end wall 116. Furthermore, steam is passed through the second steam passageways 122 of the annular duct 102 which acts to cool the walls forming the converging region 112 and the diverging region 114 of the annular duct 102 and to further recover heat from the exhaust matter flow.

In the embodiment of the rotary engine shown in FIG. 7, an alternative duct 124 has an annular throat region 126 which has an axial width approximately equal to that of the thrust matter discharge port 50 of the thrust matter jet assemblies 40 of the rotor 36. Thus, the exhaust matter flow exiting the rotor 36 travels through the annular throat region 126 of the alternative duct 124 with minimal deceleration. As the exhaust flow reaches the annular diverging region 128 of the alternative duct 124, it encounters a discontinuity which promotes a wave to decelerate the exhaust matter down to a subsonic velocity via a standing shock wave in the annular diverging region 128 of the alternative duct 124. From this point, the alternative duct operates identically to the annular duct 102 of the preferred embodiment.

Upon exiting the annular duct 102 of the main engine assembly 22, the exhaust matter discharged from the rotor 36 passes into the super-heater 30. The super-heater 30 comprises a generally tubular passageway having a plurality of small steam-filled tubes (now shown) passing therein. The steam passing within the steam tubes of the super-heater 30 are in communication with the first steam passageway 120 of the annular duct 102 of the main engine assembly 22. While in the super-heater 30, heat is transferred from the exhaust matter flow into the steam passing through the steam tubes of the super-heater.

From the super-heater 30, the exhaust matter passes into the boiling plate heat exchanger 32 which contains the water that is ultimately converted into steam, further reducing the temperature of the exhaust matter flow and recovering heat therefrom. Finally, the exhaust matter is discharged from the heat exchanger 32 and the rotary engine 20 via an exhaust pipe. The exhaust pipe is configured to expel the exhaust matter into the environment external to the rotary engine or, optionally, into an exhaust system which transports the exhaust matter away from the rotary engine.

As discussed above and shown in FIG. 8, it should be understood that the exhaust matter flow from the rotor is used to super-heat the steam that is ultimately supplied to the central steam tube 78 of the rotor 36. As water is supplied to the boiling plate heat exchanger 32 of the rotary engine 20, it is converted into steam which then passes into the super-heater 30 of the rotary engine where it is heated to a temperature far above that of boiling. After passing through the super-heater 30, the steam travels into the first and second steam passageways 120,122 of the annular duct 102 where it is further heated. From the annular duct 102, a portion of the super heated steam can optionally be used to hydroxylate the fuel being supplied to the combustion chamber 96 of the stator 38 while the remainder of the super heated steam passes into the central steam tube 78 of the rotor 36. Within the rotor 36, further heat is transferred from the thrust matter flow in the thrust matter passageways 44 to the steam flow in the steam passageways 58 via conduction through the thrust matter tubes 52. Thus, in the rotary engine 20 of the preferred embodiment of the invention, the steam functions as part of a bottoming cycle in which as much of the heat energy of the exhaust is recovered via the steam cooling thereof.

In view of the above, it should be appreciated that several objects of the invention are achieved and other advantageous results are attained. It should also be understood that the individual objects of the invention and the advantages of each could be practiced independently of each other. For example, many of the principles of the invention could be utilized in a steam jet rotary engine that does not include any combustion chamber (i.e., a steam only rotor). Thus, as various changes could be made in the above constructions without departing from the scope of the invention, it is intended that all matter contained in the above description or shown in the accompanied drawings shall be interpreted as illustrative and not in a limiting sense.

What is claimed is:

1. A jet-propelled rotary engine comprising:
   a stator;
   a rotor operatively coupled to the stator for rotation of the rotor relative to the stator about a rotor axis, the rotor comprising at least first and second jet assemblies, the first and second jet assemblies being adapted to traverse a circular path as the rotor rotates about the rotor axis, the first jet assembly defining a first converging flow region, a first diverging flow region downstream of the first converging flow region, and a first discharge port, the second jet assembly defining a second converging flow region, a second diverging flow region downstream of the second converging flow region, and a second discharge port;
   a combustion region having an upstream portion, the rotary engine being adapted to cause a combustion reaction of an oxygen-fuel mixture in the combustion region in a manner to form combustion reaction products which comprise at least a part of thrust matter to be discharged through the discharge ports of the first and second jet assemblies, the rotary engine being adapted to combust at least some of the oxygen-fuel mixture in the upstream portion of the combustion region such that at least a portion of the combustion reaction occurs in the upstream portion of the combustion region, the rotary engine being adapted and configured to channel at least some of the thrust matter formed in the upstream portion of the combustion region through the discharge ports of the first and second jet assemblies and adapted to discharge the thrust matter from the discharge port of the first and second jet assemblies at a supersonic velocity; and
   a generally annular duct circumscribing the circular path, the duct having an annular diverging region, the diverging region of the duct diverging radially outwardly.

2. A jet-propelled rotary engine as set forth in claim 1 wherein the duct further comprises an annular end wall having an inner surface circumscribing the diverging region of the duct.

3. A jet-propelled rotary engine as set forth in claim 2 wherein the inner surface of the end wall is generally concave as viewed in cross-section taken along a plane containing the rotor axis.

4. A jet-propelled rotary engine comprising:

a stator;

a rotor operatively coupled to the stator for rotation of the rotor relative to the stator about a rotor axis, the rotor comprising at least first and second jet assemblies, the first and second jet assemblies being adapted to traverse a circular path as the rotor rotates about the rotor axis, the first jet assembly defining a first converging flow region, a first diverging flow region downstream of the first converging flow region, and a first discharge port, the second jet assembly defining a second converging flow region, a second diverging flow region downstream of the second converging flow region and a second discharge port;

a combustion region having an upstream portion, the rotary engine being adapted to cause a combustion reaction of an oxygen-fuel mixture in the combustion region in a manner to form combustion reaction products which comprise at least a part of thrust matter to be discharge through the discharge ports of the first and second jet assemblies, the rotary engine being adapted to combust at least some of the oxygen-fuel mixture in the upsteam portion of the combustion region such that at least a portion of the combustion reaction occurs in the upstream portion of the combustion region, the rotary engine being adapted and configured to channel at least some of the thrust matter formed in the upstream portion of the combustion region through the discharge ports of the first and second jet assemblies and adapted to discharge the thrust matter from the discharge ports of the first and second jet assemblies at a supersonic velocity; and a generally annular duct circumscribing the circular path, the duct having an annular diverging region, the diverging region of the duct diverging radially outwardly, the duct having a generally annular converging region, the diverging region of the duct circumscribing the converging region of the duct, the converging region of the duct converging radially outwardly.

5. A jet-propelled rotary engine comprising:

a stator;

a rotor operatively coupled to the stator for rotation of the rotor relative to the stator about a rotor axis, the rotor comprising at least first and second jet assemblies, the first and second jet assemblies being adapted to traverse a circular path as the rotor rotates about the rotor axis, the first jet assembly defining a first converging flow region, a first diverging flow region downstream of the first converging flow region, and a first discharge port, the second jet assembly defining a second converging flow region, a second diverging flow region downstream of the second converging flow region, and a second discharge port;

a combustion region having an upstream portion, the rotary engine being adapted to cause a combustion reaction of an oxygen-fuel mixture in the combustion region in a manner to form combustion reaction products which comprise at least a part of thrust matter to be discharge through the discharge ports of the first and second jet assemblies, the rotary engine being adapted to combust at least some of the oxygen-fuel mixture in the upstream portion of the combustion region such that at least a portion of the combustion reaction occurs in the upstream portion of the combustion region, the rotary engine being adapted and configured to channel at least some of the thrust matter formed in the upstream portion of the combustion region through the discharge posts of the first and second jet assemblies and adapted to discharge the thrust matter from the discharge ports of the first and second jet assemblies at a supersonic velocity; and a generally annular duct circumscribing the circular path, the duct having an annular diverging region, the diverging region of the duct diverging radically outwardly, the duct comprising an annular end wall having an inner surface circumscribing the diverging region of the duct, the duct further comprising a fluid passageway adapted for the passage of a cooling fluid to cool the duct.

6. A jet-propelled rotary engine comprising:

a stator;

a rotor operatively coupled to the stator for rotation of the rotor relative to the stator about a rotor axis, the rotor comprising at least one jet assembly, the jet assembly being adapted to traverse a circular path as the rotor rotates about the rotor axis, the jet assembly defining a converging flow region, a diverging flow region downstream of the converging flow region, and a discharge port;

a combustion region having an upstream portion, the upstream portion being spaced from the rotor axis a distance not greater than 90% of R, where R is the shortest distance between the rotor axis and the jet stream centerline, the rotary engine being adapted to cause a combustion reaction of an oxygen-fuel mixture in the combustion region in a manner to form combustion reaction products which comprise at least a part of thrust matter to be discharged through the discharge port, the rotary engine being adapted to combust at least some of the oxygen-fuel mixture in the upstream portion of the combustion region;

a generally annular duct circumscribing the circular path traversed by the jet assembly, the duct having a generally annular diverging region, the diverging region of the duct diverging radially outwardly;

the jet assembly being adapted for supersonic discharge of a jet stream of the thrust matter from the discharge port with the jet stream having a jet stream centerline as the thrust matter is being discharged from the discharge port.

7. A jet-propelled rotary engine as set forth in claim 6 wherein the upstream portion of the combustion region is spaced from the rotor axis a distance not greater than 75% of R.

8. A jet-propelled rotary engine as set forth in claim 7 wherein the upstream portion of the combustion region is spaced from the rotor axis a distance not greater than 50% of R.

9. A jet-propelled rotary engine as set forth in claim 8 wherein the upstream portion of the combustion region is spaced from the rotor axis a distance not greater than 25% of R.

10. A jet-propelled rotary engine as set forth in claim 6 wherein the jet assembly is a first jet assembly, the rotor further comprising a second jet assembly defining a second converging flow region, a second diverging flow region downstream of the second converging flow region, and a second discharge port, the second jet assembly being adapted for supersonic discharge of a second jet stream of the thrust matter from the second discharge port with the second jet stream defining a second jet stream centerline where the thrust matter is being discharged from the second discharge port, the second jet stream centerline being spaced from the rotor axis a distance equal to R.

11. A jet-propelled rotary engine as set forth in claim 6 wherein the upstream portion of the combustion region is defined at least in part by the stator.

12. A jet-propelled rotary engine comprising:
a stator;
a rotor operatively coupled to the stator for rotation of the rotor relative to the stator about a rotor axis, the rotor comprising at least one jet assembly, the jet assembly defining a converging flow region, a diverging flow region downstream of the converging flow region, and a discharge port, the jet assembly being adapted to traverse a circular path as the rotor rotates about the rotor axis;
a combustion region defined at least in part by the rotor, the combustion having an upstream portion, the rotary engine being adapted to cause a combustion reaction of an oxygen-fuel mixture in the combustion region in a manner to form combustion reaction products which comprise at least a part of thrust matter to be discharged through the discharge port of the jet assembly, the rotary engine being adapted to combust at least some of the oxygen-fuel mixture in the upstream portion of the combustion region such that at least a portion of the combustion reaction occurs in the upstream portion of the combustion region, the rotary engine being adapted and configured to channel at least some of the thrust matter formed in the upstream portion of the combustion region through the discharge port of the jet assembly; and
a generally annular duct circumscribing the circular path traversed by the jet assembly, the duct having a generally annular duct diverging region, an annular duct converging region, and an annular duct end wall, the duct diverginge region diverging radially outwardly, the duct end wall having an inner surface circumscribing the duct diverging region, the duct diverging region circumscribing the duct converging region, the duct converging region converging radially outwardly.

13. A jet-propelled rotary engine comprising:
a stator;
a rotor operatively coupled to the stator for rotation of the rotor relative to the stator about a rotor axis, the rotor comprising at least one jet assembly, the jet assembly defining a converging flow region, a diverging flow region downstream of the converging flow region, and a discharge port, the jet assembly being adapted to traverse a circular path as the rotor rotates about the rotor axis;
a combustion region defined at least in part by the rotor, the combustion region having an upstream portion, the rotary engine being adapted to cause a combustion reaction of an oxygen-fuel mixture in the combustion region in a manner to form combustion reaction products which comprise at least a part of thrust matter to be discharged through the discharge port of the jet assembly, the rotary engine being adapted to combust at least some of the oxygen-fuel mixture in the upstream portion of the combustion region such that at least a portion of the combustion reaction occurs in the upstream portion of the combustion region, the rotary engine being adapted and configured to channel at least some of the thrust matter formed in the upstream portion of the combustion region through the discharge port of the jet assembly; and
a generally annular duct circumscribing the circular path traversed by the jet assembly, the duct having a generally annular duct diverging region and an annular duct end wall, the duct diverging region diverging radially outwardly, the duct end wall having an inner surface circumscribing the duct diverging region, the duct further comprises a fluid passageway adapted for the passage of a cooling fluid flow to cool the duct end wall.

14. A jet-propelled rotary engine comprising:
a stator;
a rotor operatively coupled to the stator for rotation of the rotor relative to the stator about a rotor axis, the rotor comprising at least one thrust matter jet assembly and at least one steam jet assembly, the thrust matter jet assembly defining a converging flow region, a diverging flow region downstream of the converging flow region, and a discharge port, the thrust matter jet assembly being adapted to traverse a circular path as the rotor rotates about the rotor axis, the steam jet assembly defining a steam converging flow region, a steam diverging flow region downstream of the steam converging flow region, and a steam discharge port, the rotary engine being adapted and configured to channel steam through the steam discharge port of the steam jet assembly;
a combustion region defined at least in part by the rotor, the combustion region having an upstream portion, the rotary engine being adapted to cause a combustion reaction of an oxygen-fuel mixture in the combustion region in a manner to form combustion reaction products which comprise at least a part of thrust matter to be discharged through the discharge port of the thrust matter jet assembly, the rotary engine being adapted to combust at least some of the oxygen-fuel mixture in the upstream portion of the combustion region such that at least a portion of the combustion reaction occurs in the upstream portion of the combustion region, the rotary engine being adapted and configured to channel at least some of the thrust matter formed in the upstream portion of the combustion region through the discharge port of the thrust matter jet assembly;
a generally annular duct circumscribing the circular path traversed by the thrust matter jet assembly, the duct having a generally annular duct diverging region and an annular duct end wall, the duct diverging region diverging radially outwardly, the duct end wall having an inner surface circumscribing the duct diverging region.

15. A jet-propelled rotary engine as set forth in claim 14 wherein the rotary engine is configured and adapted to discharge the thrust matter from the discharge port of the thrust matter jet assembly at a first supersonic velocity, the rotary engine also being configured and adapted to discharge the steam from the steam discharge port of the steam jet assembly at a second supersonic velocity, the second supersonic velocity being greater than the first supersonic velocity.

16. A jet-propelled rotary engine as set forth in claim 14 wherein the annular duct further comprises an annular duct converging region, the duct diverging region circumscribing the duct converging region, the duct converging region converging radially outwardly, the steam jet assembly being adapted to traverse a circular steam jet path as the rotor rotates about the rotor axis, the steam jet path being at least partially within the duct converging region.

17. A jet-propelled rotary engine comprising:

a stator;

a rotor operatively coupled to the stator for rotation of the rotor relative to the stator about a rotor axis, the rotor comprising at least first and second jet assemblies, the jet assemblies being adapted to traverse a circular path as the rotor rotates about the rotor axis, the first jet assembly defining a first converging flow region, a first diverging flow region downstream of the first converging flow region, and a first discharge port, the second jet assembly defining a second converging flow region, a second diverging flow region downstream of the second converging flow region, and a second discharge port;

a combustion region having an upstream portion defined by the stator, the rotary engine being adapted to cause a combustion reaction of an oxygen-fuel mixture in the combustion region in a manner to form combustion reaction products which comprise at least a part of thrust matter to be discharge through at least one of the discharge ports of the first and second jet assemblies, the rotary engine being adapted to combust at least some of the oxygen-fuel mixture in the upstream portion of the combustion region such that at least a portion of the combustion reaction occurs in the upstream portion of the combustion region, the rotary engine being adapted to discharge the thrust matter from the discharge ports of the first and second jet assemblies at a supersonic velocity; and a generally annular duct circumscribing the circular path, the duct having a generally annular diverging region, the diverging region of the duct diverging radially outwardly.

18. A jet-propelled rotary engine comprising:

a stator;

a rotor operatively coupled to the stator for rotation of the rotor relative to the stator about a rotor axis, the rotor comprising at least first and second jet assemblies that are adapted to traverse a circular path as the rotor rotates about the rotor axis, the first jet assembly defining a first converging flow region, a first diverging flow region downstream of the first converging flow region, and a first discharge port, the second jet assembly defining a second converging flow region, a second diverging flow region downstream of the second converging flow region, and a second discharge port;

a combustion region having an upstream portion defined by the stator, the rotary engine being adapted to cause a combustion reaction of an oxygen-fuel mixture in the combustion region in a manner to form combustion reaction products which comprise at least a part of thrust matter to be discharged through at least one of the discharge ports of the first and second jet assemblies, the rotary engine being adapted to combust at least some of the oxygen-fuel mixture in the upstream portion of the combustion region such that at least a portion of the combustion reaction occurs in the upstream portion of the combustion region; and a generally annular duct circumscribing the circular path, the duct having a generally annular diverging region, the diverging region of the duct diverging radially outwardly, the duct further comprising a generally annular converging region, the diverging region of the duct circumscribing the converging region of the duct, the converging region of the duct converging radially outwardly.

19. A jet-propelled rotary engine comprising:

a stator;

a rotor operatively coupled to the stator for rotation of the rotor relative to the stator about a rotor axis, the rotor comprising at least first and second jet assemblies that are adapted to traverse a circular path as the rotor rotates about the rotor axis, the first jet assembly defining a first converging flow region, a first diverging flow region downstream of the first converging flow region, and a first discharge port, the second jet assembly defining a second converging flow region, a second diverging flow region downstream of the second converging flow region, and a second discharge port;

a combustion region having an upstream portion defined by the stator, the rotary engine being adapted to cause a combustion reaction of an oxygen-fuel mixture in the combustion region in a manner to form combustion reaction products which comprise at least a part of thrust matter to be discharge through at least one of the discharge ports of the first and second jet assemblies, the rotary engine being adapted to combust at least some of the oxygen-fuel mixture in the upstream portion of the combustion region such that at least a portion of the combustion reaction occurs in the upstream portion of the combustion region; and a generally annular duct circumscribing the circular path, the duct having a generally annular diverging region, the diverging region of the duct diverging radially outwardly, the duct further comprising an annular end wall and a fluid passageway, the annular end wall having an inner surface circumscribing the diverging region of the duct, the fluid passageway being adapted for the passage of a cooling fluid to cool the duct.

20. A method comprising:

providing a jet-propelled rotary engine comprising a stator, a rotor, a combustion region, and a generally annular duct, the rotor being operatively coupled to the stator for rotation of the rotor relative to the stator about a rotor axis, the rotor comprising at least one jet assembly, the jet assembly defining a converging flow region, a diverging flow region downstream of the converging flow region, and a discharge port, the jet assembly being adapted to traverse a circular path as the rotor rotates about the rotor axis, the combustion region being defined at least in part by the rotor, the combustion region having an upstream portion, the rotary engine being adapted to cause a combustion reaction of an oxygen-fuel mixture in the combustion region in a manner to form combustion reaction products which comprise at least a part of thrust matter to be discharge through the discharge port of the jet assembly, the rotary engine being adapted to combust at least some of the oxygen-fuel mixture in the upstream portion of the combustion region such that at least a portion of the combustion reaction occurs in the upstream portion of the combustion region, the rotary engine being adapted and configured to channel at least some of the thrust matter formed in the upstream portion of the combustion region through the discharge port of the jet assembly, the duct circumscribing the circular path traversed by the jet assembly; and passing a cooling fluid adjacent the annular duct in a manner to cool the duct.

21. A method as set forth in claim 20 wherein the step of passing a cooling fluid adjacent the annular duct comprises passing steam adjacent the annular duct in a manner to cool the duct.

22. A method as set forth in claim 20 wherein the step of providing a jet-propelled rotary engine comprises providing a jet-propelled rotary engine such that the duct has a generally annular diverging region, the diverging region of the duct diverging radially outwardly.

23. A method as set forth in claim 22 wherein the step of providing jet-propelled rotary engine comprises providing a jet-propelled rotary engine such that the duct further comprises a generally annular converging region, the diverging region of the duct circumscribing the converging region of the duct, the converging region of the duct converging radially outwardly.

24. A method as set forth in claim 22 wherein the step of providing a jet-propelled rotary engine comprises providing a jet-propelled rotary engine such that the duct comprised an annular end wall having an inner surface circumscribing the diverging region of the duct, the inner surface of the duct being generally concave as viewed in cross-section taken along a plane containing the rotor axis.

* * * * *